Sept. 6, 1932.   W. V. DARLING, JR., ET AL   1,875,424
SIGNAL DEVICE
Filed July 13, 1931   2 Sheets-Sheet 1
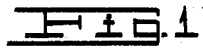
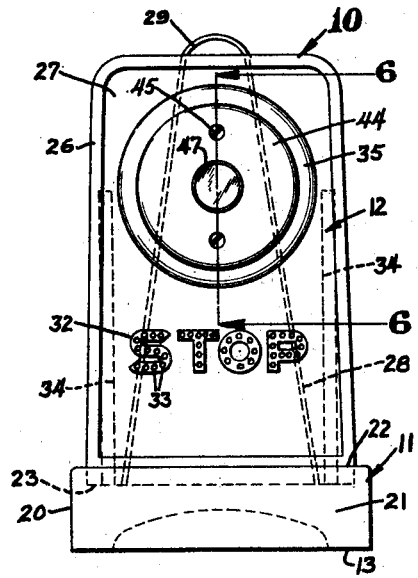
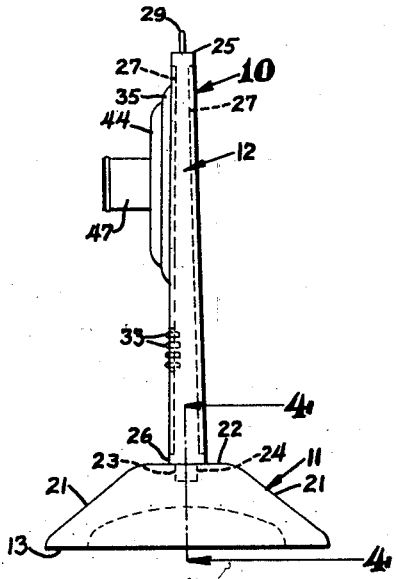
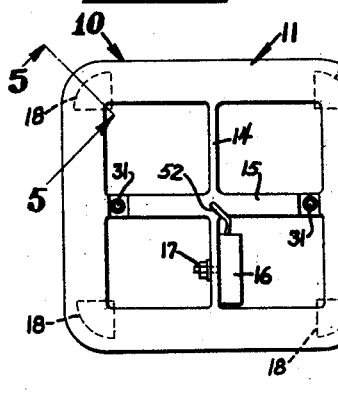
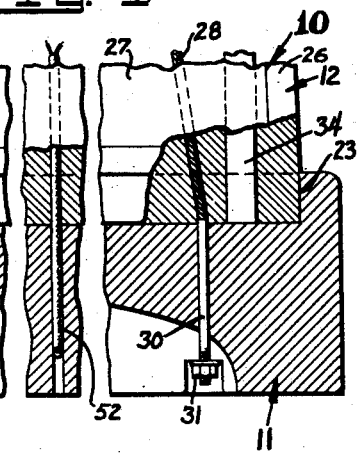
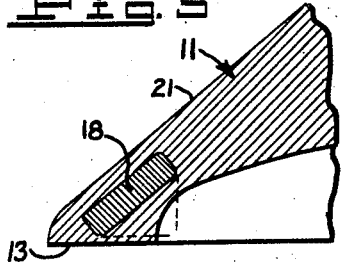
INVENTORS.
W. V. DARLING JR.
R. J. DYKSTRA.
BY
B. J. Craig
ATTORNEY.

Sept. 6, 1932.　　W. V. DARLING, JR., ET AL　　1,875,424
SIGNAL DEVICE
Filed July 13, 1931　　2 Sheets-Sheet　2
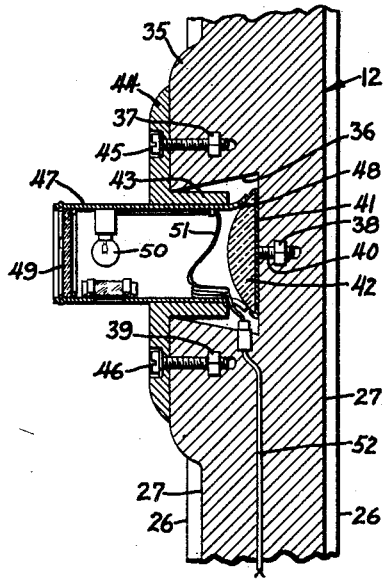
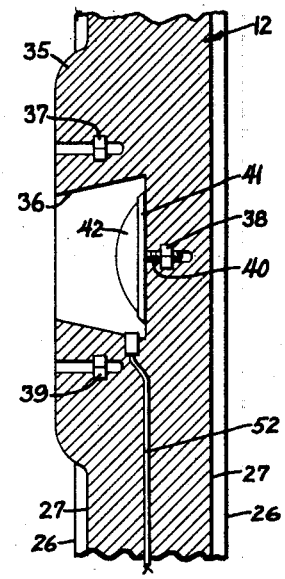
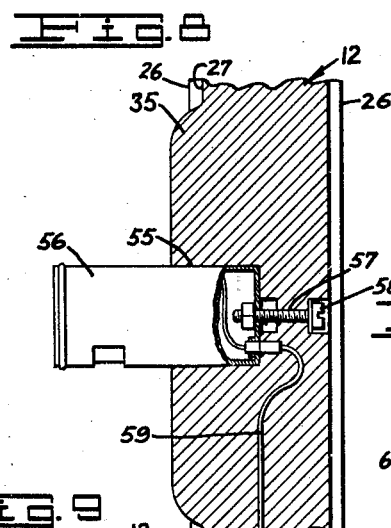
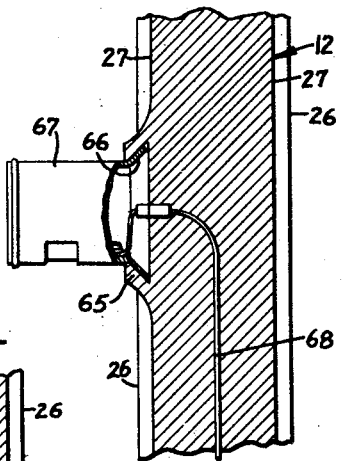
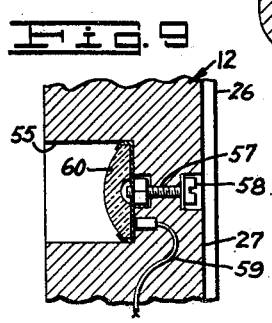
INVENTORS.
W. V. DARLING JR.
R. J. DYKSTRA
BY
B. J. Craig
ATTORNEY.

Patented Sept. 6, 1932

1,875,424

UNITED STATES PATENT OFFICE

WILLIAM V. DARLING, JR., OF RIVERSIDE, CALIFORNIA, AND RUDOLPH J. DYKSTRA, OF THOMPSON FALLS, MONTANA

SIGNAL DEVICE

Application filed July 13, 1931. Serial No. 550,468.

This invention relates to signal devices.

The general object of the invention is to provide an improved flexible, portable pavement signal.

A further object of the invention is to provide a signal device including a flexible base having signal member secured thereto in novel manner.

An additional object of the invention is to provide a base having a novel signal member thereon.

Another object of the invention is to provide a novel flexible signal member for use with pavement signals.

A more specific object of the invention is to provide a signal member having a base, of such weight as to maintain the signal erect, having a flexible signal panel secured to said base.

An additional object of the invention is to provide a signal member including a base and having a flexible signal panel removably secured thereto.

A further object of the invention is to provide a signal having a novel combined reinforcing member and handle.

Other objects of the invention will be apparent from the following description taken in connection with the accompanying drawings, wherein:

Fig. 1 is a front elevation of a signal embodying the feature of our invention.

Fig. 2 is a side elevation of the device.

Fig. 3 is a bottom plan view.

Fig. 4 is a section on line 4—4 Fig. 2.

Fig. 5 is a section on line 5—5 Fig. 3.

Fig. 6 is a section on line 6—6 Fig. 1.

Fig. 7 is a similar view with the lamp removed.

Fig. 8 is a fragmentary section showing a modified signal member and light.

Fig. 9 is a view similar to Fig. 8 with the light replaced by a reflector.

Fig. 10 is a fragmentary section showing a further modification of signal and light.

Fig. 11 is a view similar to Fig. 10 with the light replaced by a reflector.

Fig. 12 is a front elevation showing an auxiliary signal member and

Fig. 13 is a side elevation showing the auxiliary signal member.

Referring to the drawings by reference characters we have shown our invention as embodied in a signal indicated generally at 10. As shown the signal comprises a base 11, which may be composed of rubber suitably vulcanized, and a signal member 12 also of rubber. If desired the base 11 may be vulcanized harder than the signal member 12. The signal member 12 is flexible so that should a vehicle run over the signal it would not damage the signal member, the base, or the vehicle but due to the bending of the member 12 the parts would flex until the vehicle had passed over the signal after which the signal member 12 would return to its normal position. The base 11 is provided with a flat peripheral portion 13 upon which it rests and with transverse ribs 14 and 15 connected to the peripheral portion 13. On one of the ribs 14 I may secure a battery 16 by means of a fastening member such as a bolt 17. The purpose of this fastening member will be presently described.

In each corner of the base 11 we preferably embed a weighted member 18 which is indicated as having a curved outer portion 19 although the shape and the size of the weighted member 18 may be varied to suit the circumstances. The base 11 is shown as having planer ends 20 and as having inclined top faces 21 which merges into a top 22 which is provided with a slot 23. The signal member 12 is provided with a lower portion 24 which fits within the slot 23. The signal member 12 toppers towards its free end 25 and is provided with a peripheral bead 26 extending entirely about each face thereof, thus protecting the edge of the signal member and providing a panel 27 on the front and back faces.

To secure the signal member 12 on the base 11 a flexible member such as a metal cable 28 is embedded in the signal member 12. A loop 29 of this cable is exposed to form a handgrip while each end of the cable is secured as by welding or in any desired manner to a bolt 30. The bolts 30 are arranged in apertures in the base 11, are engaged by nuts 31 which when tightened hold the signal member on the base.

The signal member may be provided with suitable indicia such as the word "Stop" indicated at 32. As shown the word "Stop" is painted on the signal member and in the paint outlines reflectors 33 are arranged to outline the word "Stop". The reflectors 33 are placed in holes which may be molded in the signal member 12 or which may be placed therein after the signal member has been molded.

The signal member is provided with flexible reinforcing members 34 embedded along each side thereof. These members 34 are preferably made of spring steel and serve to maintain the signal member erect and to return it to normal position when displaced therefrom.

Intermediate its length the signal member is provided with a round protuberance 35 through which a tapering aperture 36 extends. Molded within the signal member we show nuts 37, 38 and 39. The nut 38 is engaged by a bolt 40 on the casing 41 of a reflector lens 42. Fitted in the aperture 36 we show a collar 43 which has a flange 44 thereon. Bolts 45 and 46 pass through the flange 44 and engage the nuts 37 and 39 to hold the collar 43 in place. A signal lamp including a casing 47 has a flaring inner portion 48 which engages the lens 42 and the collar 43 to hold the parts assembled. The casing 47 includes a transparent plate 49 and a lamp 50 which is connected by wires 51 to a wire 52 which is embedded in the signal member 12 and which extends to the battery 16 previously described.

In use the signal member will be arranged as shown in Fig. 6 with the wire 52 connected to the battery 16, so that the lamp 50 will be illuminated.

It may be desirable at times to omit the lamp 50 and its associated parts. An instance of this is shown in Fig. 7 wherein the reflector lens 42 and reflector casing 41 are employed without the lamp 50.

In Fig. 8 the protuberance 35 is shown and aperture 55 is arranged in this protuberance. A lamp casing 56 is secured by a bolt 57 the head 58 of which is accessible from the rear of the signal member. A wire 59 extends from the lamp casing 56 to the battery as previously described.

In Fig. 9 the lamp casing is omitted and a reflector 60 is placed in the aperture 55. This reflector is shown as held in place by a bolt 57.

In Fig. 10 the signal member 12 is provided with a resilient peripheral flange 65 which engages a flaring end 66 of a lamp casing 67 from which a wire 68 extends to the battery. The resilient peripheral flange 65 serves to hold the lamp casing in place. In Fig. 11 the lamp casing 67 is replaced by a reflector 68.

In Figs. 12 and 13 the signal "stop" is covered by a rubber plate 70 having the word "Slow" thereon. This plate is held in place by resilient clips secured to the plate and having an end bent to engage the body of the signal.

From the foregoing description it will be apparent that we have invented an improved signal member which is highly efficient in use and which can be economically manufactured.

Having thus described our invention we claim:

1. In a pavement signal, a resilient body having an upstanding signal member thereon, said signal member comprising a flexible body having a face with indicia thereon and having a flexible metal reinforcing member embedded therein, said flexible reinforcing member having a loop exposed at the top of said signal member, said signal member having a pocket therein and a warning device in said pocket.

2. In a pavement signal, a resilient body having a top with inclined faces, a peripheral lower rim on said body, the under surface of said body being recessed, ribs extending across said recess from one side of the body to the other edge, a flexible signal member on said body, said member having indicia thereon, means to reinforce said member and means to reinforce said body, a lamp on said member, a battery on one of said ribs and a wire connecting said battery and lamp.

3. In a pavement signal, a resilient base having planer ends and having a flat bottom portion and inclined top surfaces, said base having a slot therein and having a weighted member at each corner thereof, a signal member having its lower extremity extending into said slot, said signal member comprising a tapered flexible body having a face with indicia thereon and having a flexible metal reinforcing member embedded therein, said flexible reinforcing member having a loop exposed at the top of said signal member, a pair of threaded members on the ends of said flexible members, said threaded members extending through said base, nuts on said threaded members engaging said base to hold the base and member assembled, said signal member having a pocket therein, a lamp case in said pocket, means to hold said lamp case in position and wires extending from said lamp through said signal member to said base.

4. In a pavement signal, a resilient body having planer ends and having a flat bottom portion and inclined top surfaces, said body having a slot therein and having a weighted member at each corner thereof, a signal member having its lower extremity extending into said slot, said signal member being flexible and having a face with indicia thereon, a flexible metal reinforcing member embedded in said signal member, said flexible reinforcing member having a loop exposed at the top of said signal member, a pair of threaded members on the ends of said flexible member, said threaded members extending through said base, nuts on said threaded members to hold the body and member assembled, said signal member having a pocket therein, a lamp case in said pocket, means to hold said lamp case in position and wires extending from said lamp through said signal member to said base, and said base having transverse ribs thereon, a battery secured to one of said ribs, said wires being connected to said battery.

5. In a pavement signal, a base made of vulcanized rubber and having a slot therein, a flexible signal member made of vulcanized rubber and having one end extending into said slot, a reenforcing member secured to said signal member and means engaging said reenforcing member and said base to hold said signal member on said base, said reenforcing member being flexible and extending along said signal member.

6. In a pavement signal, a resilient rubber polygonial body having a peripheral lower rim, weights in the corners of said rim, the under surface of said body being recessed, ribs extending across said recess from one side of the body to the other edge and a flexible signal member on said body.

7. In a pavement signal, a base having planer ends and having a flat bottom portion and an inclined top surface, said base having a slot therein, extending part way therethrough a signal member having its lower extremity extending into said slot, said signal member comprising a flexible body having a face with indicia thereon, a pair of flexible reenforcing members secured to said signal member, said flexible members extending through said base, and means on said members engaging said base to hold the base and member assembled.

8. In a pavement signal, a resilient base having planer ends and having a flat bottom portion and inclined top surfaces, said base having a slot therein and having a weighted member at each corner thereof, a signal member having its lower extremity extending into said slot, said signal member comprising a tapered flexible body having a face with indicia thereon and having a flexible metal reinforcing member embedded therein, said flexible reinforcing member having a loop exposed at the top of said signal member, the lower ends of said flexible member extending through said base, means on the ends of said member engaging said base to hold the base and member assembled.

9. In a pavement signal, a resilient body having planer ends and having a flat bottom portion and inclined top surfaces, said body having a slot therein and having a weighted member at each corner thereof, a signal member having its lower extremity extending into said slot, said signal member being flexible and having a face with indicia thereon, a flexible metal reinforcing member embedded in said signal member, said flexible metal reinforcing member having a loop exposed at the top of said signal member, and having its lower ends extending through said base, means on said ends to hold the body and member assembled, said signal member having a pocket therein, a lamp case in said pocket, means to hold said lamp case in position and wires extending from said lamp through said signal member to said base, said base having a battery secured thereto, said wires being connected to said battery.

In testimony whereof, we hereunto affix our signatures.

WILLIAM V. DARLING, Jr.
RUDOLPH. J. DYKSTRA.